May 1, 1962 E. T. JOHNSON ETAL 3,031,829
TRACTOR-MOUNTED MOWER
Filed April 27, 1960 2 Sheets-Sheet 1

*INVENTORS*
E. T. JOHNSON
C. B. PEAK

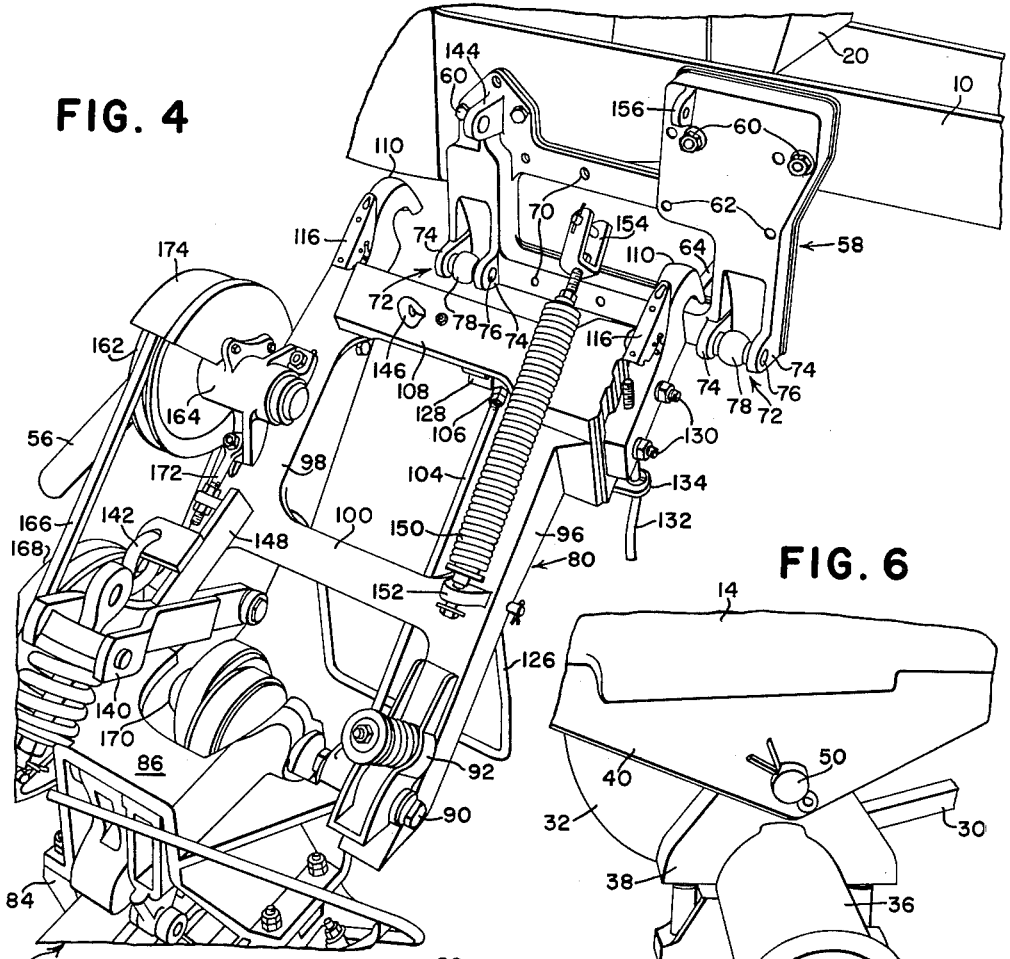

United States Patent Office 3,031,829
Patented May 1, 1962

3,031,829
TRACTOR-MOUNTED MOWER
Ellsworth T. Johnson, Moline, and Charles B. Peak, Geneseo, Ill., assignors to Deere & Company, Moline, Ill., a corporation of Delaware
Filed Apr. 27, 1960, Ser. No. 25,147
5 Claims. (Cl. 56—25)

This invention relates to a tractor-mounted mower and more particularly to the type commonly referred to as a side-mounted mower, having the characteristics that it is mounted at one side of the tractor body and intermediate the front and rear wheels of the tractor.

Mowers of this specific type have several advantages but their appeal to the average user is diminished somewhat by the problems involved in mounting and dismounting same and in effecting the necessary drive and lift connections. According to the present invention, these disadvantages are eliminated by the provision of a simple structure featuring a one-piece hanger bracket, preferably in the form of a casting, which may be readily mounted on the tractor. The hanger bracket is further characterized by the provision of means whereby it can be adapted to fit many types and models of tractors. The bracket, in combination with a simple laterally outwardly extending mower frame and cutting mechanism attached to this frame gives in effect a three-unit structure. Another feature of the invention is the provision in the mower attachment for the use of a force-exerting device which may be the typical remote hydraulic cylinder commonly furnished with agricultural tractors. Provision is made for readily mounting and dismounting the cylinder between the mower frame and hanger bracket. Another object of the invention is to provide an improved design in which the mower frame may be readily supported in a stored or parked position when detached from the tractor. The hanger bracket is so designed that, unless it interferes with the mounting or use of other implements, it may be left on the tractor even through the mower and its supporting frame are detached.

Further objects reside in improved drive means for the mower, improved means for adjusting the tilt of the frame relative to the hanger bracket, and such other features and characteristics as will appear from the following detailed description of a preferred embodiment of the invention as illustrated in the accompanying sheets of drawings, the several figures of which are described below.

FIG. 4 is a fragmentary perspective view, on a scale somewhat enlarged over that of FIG. 1 and taken from a different angle, showing the relationship of the detached mower to the tractor-carried hanger bracket.

FIG. 5 is a fragmentary perspective view as seen from the rear of the tractor and illustrating part of the drive means.

FIG. 6 is an enlarged fragmentary perspective view looking at the structure as seen from the front of FIG. 5, designated by the encircled numeral 6 and attached arrow.

Figures 1, 2, 3:
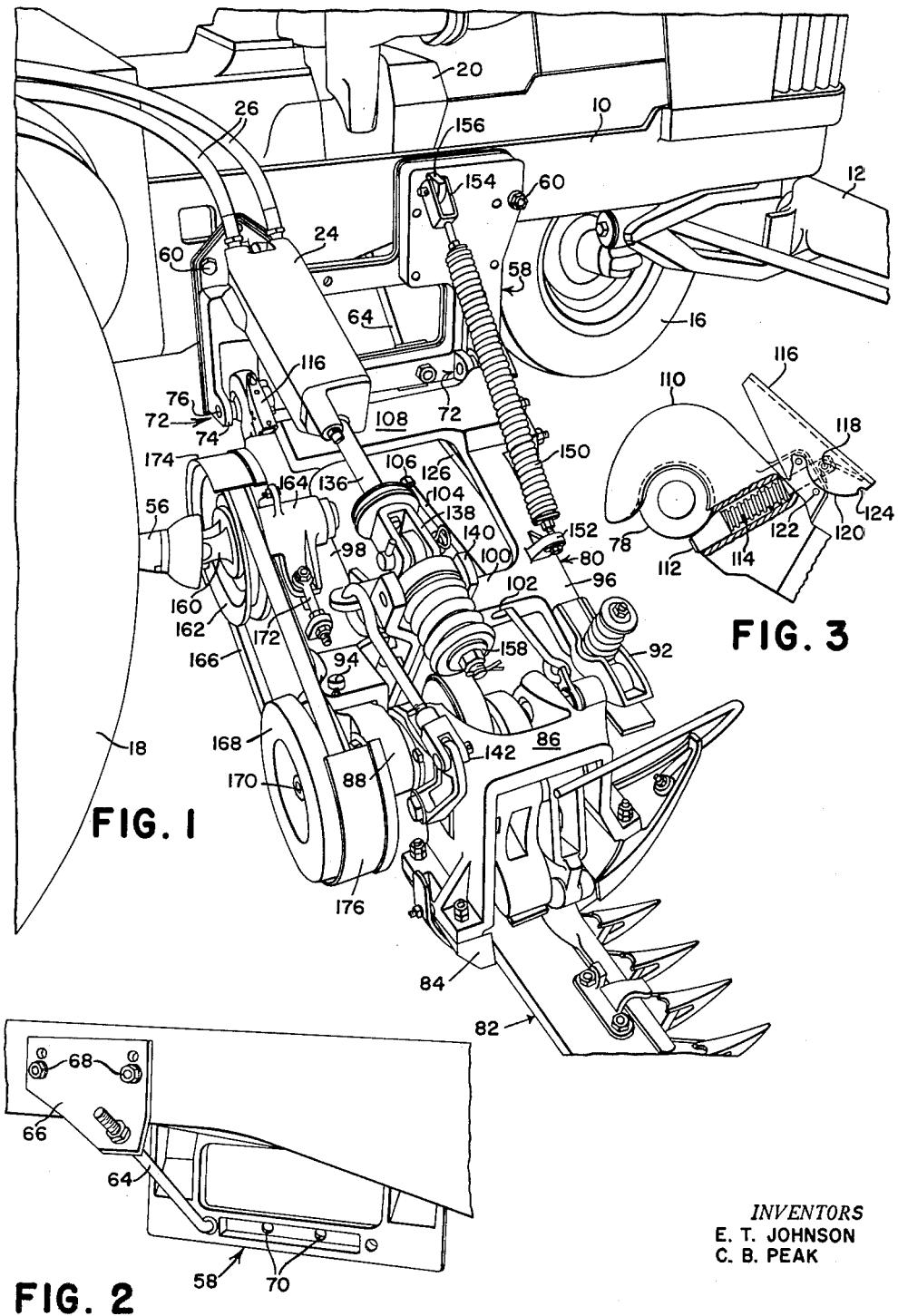
FIG. 1 is a fragmentary perspective view showing the basic parts of the mower attachment as related to the tractor.
FIG. 2 is a fragmentary perspective view from the opposite side of the tractor and illustrating part of the means for mounting the hanger bracket on the tractor.
FIG. 3 is an enlarged view, partly in section, showing one of the releasable connectors used between the mower frame and the hanger bracket.

The tractor structure illustrated in the drawings is representative of a typical farm tractor design, the tractor having a longitudinal or fore-and-aft body 10 carried on a front axle 12 and a rear axle 14 (FIGS. 5 and 6). The front axle has a pair of laterally spaced front wheels, one of which is visible at 16. One of the rear traction wheels is visible in part at 18. The numeral 20 designates the tractor engine which furnishes power for the tractor as well as for the tractor power take-off shaft and hydraulic pump.

Here, as in any typical tractor design, the hydraulic pump is contained within a housing 22 at the rear of the tractor (FIG. 5) and fluid under pressure is supplied to a force-exerting device or remote hydraulic cylinder (FIG. 1) via conduits or hoses 26. A representative hydraulic system of the general character referred to is disclosed in U.S. Patent 2,532,552.

The power take-off of the tractor is also located at the rear but is here concealed because it has mounted thereon a drive sheave 28 which is connected by a belt 30 to another sheave 32 that is keyed or otherwise fixed to a short fore-and-aft extending shaft 34 (FIG. 6). The shaft 34 is journaled in a longitudinal tube 36 which is in turn mounted by a two-piece clamp 38 on a bracket 40 at the rear of the rear axle 14 and to one side of the tractor longitudinal centerline. Tractors of the type shown conventionally have their rear axle housings provided with means for mounting implements and in the present case such means takes the form of a plurality of studs 42 for receiving a plate 44 which is a rigid part of the bracket 40 and which has therein a plurality of keyhole slots 46 to receive the studs. Nuts 48, threaded on the studs, render the bracket 40 easily mountable and demountable.

The clamp 38 is removably carried by a depending portion of the bracket 40 through the medium of a fore-and-aft pin 50 which enables pivoting of the shaft and clamp for the purpose of varying the distance between the sheaves 28 and 32 so that the tension on the belt 30 may be adjusted. The means for accomplishing the adjustment and for securing the adjusted position is shown here as including a threaded member 52 projecting upwardly from the clamp 38 through the bracket 40 and having thereon a tail nut 54.

The forward end of the shaft 34 is splined and projects just beneath and forwardly of the axle housing at the right hand side of the tractor, at which point it is connected, as by a typical universal joint (not shown), to the rear end of a forwardly and outwardly extending propeller shaft 56, the forward end of which is connected to drive means for the mower as will be set forth in greater detail below.

Side-mounted mowers of the type known heretofore have usually been characterized by rather complicated mounting structure designed in each case especially for the particular tractor for which the mower is intended. Such design is not only expensive but it prevents the mower from being used with more than just one kind of tractor. Moreover, mounting arrangements of the earlier types normally involve structural changes in the tractor and more often than not require the addition of a multitude of braces, brackets, levers etc., all of which must be removed when the tractor is to be used with other implements.

According to the present invention, and as already indicated, these disadvantages are eliminated by the provision of a simple and novel mounting arrangement, the basic part of which comprises a support or hanger bracket indicated in its entirety by the numeral 58. This bracket is preferably a one-piece casting and is appropriately drilled at several locations to enable it to be used with several tractors. In the case of the tractor illustrated here, the mounting is accomplished by bolting the hanger bracket to one side of the tractor, intermediate the front and rear wheels, as by a plurality of bolts 60, leaving other bolt holes, as at 62, available for use of the same kind of hanger bracket with other tractors. As is well known, tractors of the agricultural type normally have holes provided at several locations on the body for the attaching of a variety of implements, and the present hanger bracket has been designed on the basis of providing a universal attachment for a wide variety of tractors.

As will be seen, the hanger bracket 58 depends from the tractor body 10 to a limited extent and the depending portion is tied into the opposite side of the tractor by means of a cross rod 64, in the form of a long bolt, which is in turn connected to a plate 66 detachably bolted as at 68 to the opposite side of the tractor. The hanger bracket itself is of adequate strength consistent with weight and the purpose for which it is intended and the mounting means at 60 and 64 enable the bracket 58 to become functionally a part of the tractor. Because the bracket is of relatively simple design, it may be left on the tractor in many cases even though the mower is detached and other implements are used with the tractor. In those cases in which it will interfere with the use or mounting of another implement, it may be easily removed.

Additional holes, as at 70, are provided for the use of other tie bolts similar to that shown at 64, which again points up the universal character of the bracket 58.

The lower portion of the bracket is provided with a pair of lower mounting means 72. These are spaced apart fore and aft on the bracket and each includes a pair of laterally outstanding ears 74 spanned by a pivot 76 which mounts a substantially spherical member 78. The pivots 76, and consequently the balls 78, are coaxial on a fore-and-aft axis, and these elements provide the main mounting means for connection to the hanger bracket of a laterally outwardly and downwardly extending mower frame 80, the inner end of which is proximate to the mounting means 72—72 and the outer end of which mounts cutting mechanism 82, which may be of conventional construction. In the present case, it includes, as is typical, an inner shoe 84 to which is rigidly connected a yoke 86 which is in turn mounted on the outer end of the mower frame 80 by means including a fore-and-aft pivot. In this case, the means includes appropriate bearing elements as at 88 and 90 (FIGS. 1 and 4), the latter of which is in the form of a pin releasably retained by a spring-loaded latch means 92. The rear bearing 88 includes a pivotal connection 94 to the mower frame 80, and there is thus established one form of the so-called break-away connection common to mowers and which typically functions to enable the cutter bar to swing rearwardly when it strikes an obstruction. In the present case, rearward force applied to the cutter bar, outwardly of the shoe 84, will overcome the force in the latch 92 and the entire cutting mechanism can swing rearwardly about the pivot 94. When the obstruction is passed, the cutter bar may be manually swung forwardly so that the bearing pin 90 is again received in the latch 92 to again establish the normal operating position of the cutting mechanism.

The mower frame 80 is, like the hanger bracket 58, essentially of one-piece light weight construction and includes front and rear laterally extending legs 96 and 98, the former of which carries the latch 92 and the latter of which carries the pivot pin 94. These legs are cross connected intermediate their ends by a unitary cross bar 100 which is apertured at 102 to receive a stop rod 104 which has one end connected to the top of the yoke 86 and its other end provided with a stop 106. When the cutter bar swings rearwardly after striking an obstruction, the stop 106 strikes the cross bar 100 at the side thereof opposite to the side visible in FIG. 1, thus limiting rearward swinging of the cutter bar.

The legs 96 and 98 of the mower frame 80 are additionally cross connected at 108 adjacent to their inner ends and each leg extends inwardly beyond the cross bar 108 to provide a connector element in the form of a hook 110. These two hooks are spaced apart fore and aft on the order of the fore-and-aft spacing of the balls 78 and when the mower is connected to the hanger 58 the hooks are respectively receivable of the balls and are releasably latched in place to mount the mower frame on the hanger bracket for support thereby and also for swinging about the common axis established by the coaxial pivots 76. The latch means for retaining each hook in place is best shown in FIG. 3. Each hook has an undersurface of partly spherical shape to accommodate the associated ball 78 and an outer portion of the hook is drilled to slidably carry a latch pin 112 which is loaded by a spring 114 to project as shown and thus to engage the ball and thereby prevent lifting of the hook from the ball unless first released by a handle 116 which is pivoted at 118 on an upstanding lug on the hook. The handle has a cam portion 120 which rides a cam pin 122 in the ear on the hook so that when the handle is turned clockwise as seen in FIG. 3 the pin will be drawn upwardly against its spring 114. The cam is notched at 124 so as to engage the cam pin 122 when the latch pin is withdrawn, thereby releasably locking the latch pin in retracted position. When both handles are turned as just described, the latch pins are free from the associated balls 78 and the mower frame 80 may be lifted away from the balls and hanger. In this phase of the dismounting operation, the mower frame will swing about the fore-and-aft pivot through 88—90, and consequently the hooks will swing not only upwardly but also outwardly and away from the hanger. A parking stand 126, in the form of a bail, is pivoted to the underside of the frame 80 and may be swung from a retracted position (FIG. 1) to a parking or storage position (FIG. 4), in which it will support the detached mower frame as illustrated. A spring clip 128 (FIG. 4) may be used to retain the parking stand in its retracted position when the mower is in normal use.

One of the simplicity features of the design is that the frame 80 has built therein a slight forward angle or lead, here in the nature of one and one-half degrees, which means that when the tractor and mower are at a standstill, the cutter bar will extend slightly forwardly rather than exactly normal to the fore-and-aft center line of the tractor. However, this lead is necessary because of the rearward forces imposed on the cutter bar during operation. In prior mowers, it was necessary to provide means for adjusting this lead, which would have complicated the design. Experience has shown that the built in lead is adequate.

The only essential adjustment provided in the present design is that for accomplishing tilt of the frame 80 about a transverse axis through the rear ball 78. For this purpose, the front hook 110 is made as a separate piece from the leg 96, but the two pieces are appropriately keyed and grooved as shown to provide a vertical sliding fit which is normally retained by a pair of bolts 130. Tilting may be accomplished by loosening the bolts 130 and turning a screw 132 which is carried by an ear 134 on the leg 96 and which is threaded through the front hook 110 as shown. When the necessary adjustment has been accomplished, the bolts 130 are tightened to retain the selected position. This adjustment may of course be readily effected with the frame connected to the bracket 58, since the two parts 96 and the front hook 110 cannot become separated merely because the bolts 130 are loosened, being retained by the groove and key connection illustrated.

In normal operation, the cutting mechanism has vertical floating action about the pivot axis through 88—90 and the frame 80 is substantially held against pivoting because of the interposition of the cylinder 24, the piston 136 of which has a clevis connection 138 with an arm 140 that is pivoted to an outer portion of the frame 80. The arm is in turn linked at 142 to means on the yoke 86. The opposite end of the cylinder 24 is clevis connected by a detachable pin (not shown) to an upper rear connector in the form of an ear 144 rigid on the hanger bracket 58. When the hydraulic motor consisting of the cylinder 24 and piston 136 is retracted, the swinging arm 140 acts through the link 142 to pivot the cutting mechanism 82 about the axis of the bearings 88—90. This will swing the cutting mechanism upwardly sufficiently to clear ordinary obstructions and also will enable maneuvering of the tractor-mower outfit on corners and otherwise. The range of angular movement is typical of those found in most mowers and need not be elaborated. It will be understood, of course, that when it is desired to transport the mower, the cutter bar is raised by hand to an upright position and is retained thereby a transport rod (not shown) which is connected between the cutting bar and an eye 146 on the frame 80.

The connection at 142 between the arm 140 and the yoke 86 includes conventional mechanism whereby the cutter bar stops after a certain amount of upward movement when the cylinder 24 is retracted. In the present case, the arm 140 has a stop 148 which engages the intermediate cross bar 100 of the frame 80. Consequently, further retraction of the cylinder serves to raise the frame 80 as well as the cutter bar; although, the limited upward angular position of the cutter bar is maintained.

For the purpose of achieving floating action of the frame 80 and mower during operation, a spring 150 is connected between the frame and the bracket 58. For this purpose, the frame has an integral ear 152 thereon to which one end of the spring is connected. The other end of the spring has a pin and clevis connection 154 which is detachably connectible to an upper forward connector in the form of an apertured ear 156 integral with the bracket 58.

The clevis connection at 138 is of course detachable, as is the clevis connection at the end of the cylinder 24. Part of the linkage in the clevis connection to the arm 140 includes a compression spring 158 for cushioning the drop of the cutter bar. The cylinder 24, as described, is or may be the conventional remote cylinder commonly supplied with agricultural tractors. Consequently, it is a feature of the invention to take advantage of the availability of this cylinder for connection between the mower and the tractor as illustrated. Thus, when the mower is detached from the tractor and is not used, the cylinder 24 may be used with other implements. The detachability features, of course, not only the disconnections at 72 but also at 144 and 156, in addition to the disconnection at the clevis 138.

To carry out the ease of mounting and dismounting, the drive line to the mower is also made detachable. A portion of the drive has been previously described as including a forwardly projecting shaft 34 to which the propeller shaft 56 is connected by a universal joint (not shown).

The forward end of the propeller shaft is connected by a universal joint 160 to a sheave 162 which is appropriately journaled in a laterally adjustable bearing block 164 on the mower frame 80. A belt 166 is trained about this sheave and about an outer sheave 168 which is carried on a shaft 170 journaled in the shoe mounting means on the axis 88—90. A portion of the shaft 170 may be in the form of a crank for reciprocating the cutting mechanism. These details, however, are not material and therefore need not be described. The means for adjusting the bearing block 164 may take any form, that being shown here at 172 being only representative. The adjustability of the block 164 enables adjustment of the tension in the belt 166. The heaves 162 and 168 are appropriately shielded respectively at 174 and 176 to assist in retaining the belt 162 when the cutter bar swings rearwardly about the pivot 94. As shown in FIG. 6, the forward portion of the tube 36 that carries the shaft 34 may include a shield 178 for shielding the universal joint (not shown) against entanglement with material on the ground beneath the tractor.

As will be seen from the foregoing, the previously outlined features of simplicity combined with good design are readily achieved in the structure disclosed. Features and advantages other than those outlined here will be apparent to those versed in the art, as will many modifications and alterations in the preferred embodiment described and illustrated, all of which may be accomplished without departure from the spirit and scope of the invention.

What is claimed is:

1. A mower attachment for a tractor having a fore-and-aft body carried on front and rear wheels, comprising: a main unitary support positionable at one side of the body intermediate the front and rear wheels and having detachable means thereon for rigid attachment of said support to the body, said support having a pair of lower fore-and-aft alined mounting means, each means including a pair of laterally outstanding ears spaced apart fore and aft and including a fore-and-aft pivot spanning said ears, said pivots being coaxial, and said support further having a pair of upper fore-and-aft spaced apart connectors; a transverse mower frame having an inner end proximate to and an outer end remote from said support, said inner end having a pair of connecting elements spaced and alined on the order of the lower mounting means, each element including a downwardly opening hook receiving the associated support pivot and a cooperating releasable latch for normally securing the element to said associated pivot whereby the mower frame is normally swingable about the axis of said pivots and is further detachable as a unit from said support; cutting mechanism connected to the outer end of the frame on a fore-and-aft pivot axis and extending laterally outwardly from said frame; a force-exerting device connected at one end to the cutting mechanism and detachably connected at its other end to one of the upper connectors on the support; and an assist spring connected at one end to the frame and detachably connected at its other end to the other connector on the support.

2. The invention defined in claim 1, in which: each pivot includes a substantially ball-shaped member; and one hook is selectively vertically adjustably mounted on the frame for adjustment relative to the frame to tilt the frame about a transverse axis passing through the other ball-shaped member.

3. The invention defined in claim 1, including: a normally retracted parking stand carried by the frame and movable to a ground-engaging position to support the frame when said frame and mower are detached from the support.

4. A mower attachment for a tractor having a fore-and-aft body carried on front and rear wheels, comprising: a main unitary support positionable at one side of the body intermediate the front and rear wheels and having detachable means thereon for rigid attachment of said support to the body, said support having first and second fore-and-aft alined mounting means, each means including a pair of laterally outstanding ears spaced apart fore and aft and a member between said pair of ears and providing a fore-and-aft pivot spanning said ears, said pivots being coaxial, said member of the first means being substantially ball-shaped and centered on the fore-and-aft pivot of said first means and providing a transverse axis intersecting said pivot; a transverse mower frame having an inner end proximate to and an outer end remote from said support, said inner end having first and second connecting elements spaced and aligned on the order of the mounting means, each element including a downwardly opening hook receiving the associated mounting means member and a cooperating releasable latch for normally securing the element to said associated pivot whereby the mower frame is normally swingable about the axis of said pivots and is further detachable as a unit from said support, the hook of said first element being shaped to receive the ball-shaped member for rocking of the frame at times about said transverse axis, and said second element including means vertically adjustably mounting its hook on the frame whereby the frame may be tilted about said transverse axis of the ball-shaped member; and cutting mechanism connected to the outer end of the frame on a fore-and-aft pivot axis and extending laterally outwardly from said frame.

5. A mower attachment for a tractor having a fore-and-aft body carried on front and rear wheels and including opposite sides, comprising: a rigid unitary hanger bracket positionable at and depending from one side of the body intermediate the front and rear wheels and having detachable means thereon for rigid attachment of said support to the body, said bracket having a lower portion below the body and including a pair of lower fore-and-aft alined mounting means and an upper portion generally at the level of the body and including a pair of upper fore-and-aft spaced apart connectors; brace means connected to said lower portion of the bracket and extending upwardly and laterally toward and connected to the body at its other side; a transverse downwardly and outwardly inclined mower frame having an inner end proximate to and an outer end remote from said bracket, said inner end having a pair of connecting elements spaced and alined on the order of the mounting means, each element and the associated mounting means including a releasable connection constructed to include a fore-and-aft pivot and said pivots being coaxial for normally securing the frame to said bracket whereby the mower frame is normally swingable about the axis of said pivots and is further detachable as a unit from said bracket; cutting mechanism connected to the outer end of the frame on a fore-and-aft pivot axis and extending laterally outwardly from said frame; a force-exerting device connected at one end to the cutting mechanism and detachably connected at its other end to one of the upper connectors on the bracket; and an assist spring connected at one end to the frame and detachably connected at its other end to the other connector on the bracket.

References Cited in the file of this patent
UNITED STATES PATENTS

| | | |
|---|---|---|
| 2,256,413 | Simpson | Sept. 16, 1941 |
| 2,430,728 | Mott | Nov. 11, 1947 |
| 2,663,133 | Davis | Dec. 22, 1953 |
| 2,828,598 | Anderson et al. | Apr. 1, 1958 |